(12) United States Patent
Douglas et al.

(10) Patent No.: US 12,468,519 B2
(45) Date of Patent: Nov. 11, 2025

(54) SYSTEMS AND METHODS FOR IN-PLACE APPLICATION UPGRADES

(71) Applicant: Red Hat, Inc., Raleigh, NC (US)

(72) Inventors: Stuart Douglas, Orange (AU); Jason Greene, Madison, WI (US)

(73) Assignee: Red Hat, Inc., Raleigh, NC (US)

( * ) Notice: Subject to any disclaimer, the term of this patent is extended or adjusted under 35 U.S.C. 154(b) by 31 days.

(21) Appl. No.: 17/405,357

(22) Filed: Aug. 18, 2021

(65) Prior Publication Data

US 2023/0059134 A1 Feb. 23, 2023

(51) Int. Cl.
| | |
|---|---|
| G06F 9/44 | (2018.01) |
| G06F 8/61 | (2018.01) |
| G06F 8/65 | (2018.01) |
| G06F 8/71 | (2018.01) |
| G06F 9/455 | (2018.01) |

(52) U.S. Cl.
CPC .............. G06F 8/65 (2013.01); G06F 8/62 (2013.01); G06F 8/71 (2013.01); *G06F 9/45558* (2013.01); *G06F 2009/45562* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 6,182,245 B1 * | 1/2001 | Akin ................... | G06F 11/3672 714/38.14 |
| 9,645,808 B1 | 5/2017 | Turpie et al. | |
| 10,338,915 B2 | 7/2019 | Saxena et al. | |
| 10,901,881 B1 * | 1/2021 | Kim .................... | G06F 11/3688 |
| 2013/0275946 A1 * | 10/2013 | Pustovit .............. | G06F 11/3684 717/124 |
| 2016/0117161 A1 | 4/2016 | Parthasarathy et al. | |
| 2018/0285247 A1 * | 10/2018 | Gandhi ............... | G06F 11/3668 |
| 2020/0019493 A1 | 1/2020 | Ramakrishna et al. | |
| 2020/0089485 A1 | 3/2020 | Sobran et al. | |
| 2020/0348921 A1 * | 11/2020 | Maréchal ................. | G06F 8/65 |
| 2021/0132935 A1 * | 5/2021 | Dinh ..................... | G06F 9/4411 |

(Continued)

FOREIGN PATENT DOCUMENTS

| | | |
|---|---|---|
| CN | 108664267 A | 10/2018 |
| CN | 107463390 B | 12/2020 |
| CN | 112306552 A | 2/2021 |

*Primary Examiner* — Bradley A Teets
*Assistant Examiner* — Lanny N Ung
(74) *Attorney, Agent, or Firm* — Kilpatrick Townsend & Stockton LLP

(57) ABSTRACT

The present disclosure provides new and innovative systems and methods for in-place upgrades of applications. In an example, a computer-implemented method includes obtaining source code, obtaining automated tests, generating a software application based on the source code, the software application validated based on the automated tests and the software application includes the automated tests, deploying the software application to a production environment, obtaining update data, generating an updated application based on the update data, automatically validating the updated application based on the automated tests included in the software application, and deploying, based on the automatic validation, the updated application to the production environment.

20 Claims, 5 Drawing Sheets

(56) References Cited

U.S. PATENT DOCUMENTS

2021/0279047 A1* 9/2021 McLaren ............ G06F 11/3692
2022/0091966 A1* 3/2022 Wright ................ G06F 11/3684
2022/0156053 A1* 5/2022 Shaastry .................... G06F 8/71
2022/0269582 A1* 8/2022 Spiro ........................ G06F 8/65

* cited by examiner

SYSTEMS AND METHODS FOR IN-PLACE APPLICATION UPGRADES

BACKGROUND

A computer network includes a set of communication protocols for sharing resources between nodes connected to the network. The nodes can include computers, servers, networking hardware, and the like.

SUMMARY

The present disclosure provides new and innovative systems and methods for in-place upgrades of applications. In an example, a computer-implemented method includes obtaining source code, obtaining automated tests, generating a software application based on the source code, the software application validated based on the automated tests and the software application includes the automated tests, deploying the software application to a production environment, obtaining update data, generating an updated application based on the update data, automatically validating the updated application based on the automated tests included in the software application, and deploying, based on the automatic validation, the updated application to the production environment.

In an example, an apparatus includes a processor and a memory in communication with the processor and storing instructions that, when executed by the processor, cause the apparatus to obtain source code, obtain automated tests, generate a software application based on the source code, the software application including the automated tests and a plurality of functions validated based on the automated tests, deploy the software application to a production environment, obtain update data including an update to at least one function of plurality of functions, generate an updated application based on the update data, the updated application including the updated at least one function and the automated tests, automatically validate the updated application based on the automated tests, and deploy, based on the automatic validation, the updated application to the production environment.

In an example, a non-transitory computer readable medium storing instructions that, when executed by one or more processors, cause the one or more processors to perform steps including obtaining source code, obtaining automated tests, generating a software application based on the source code, the software application validated based on the automated tests and the software application includes the automated tests, deploying the software application to a production environment, obtaining update data, generating an updated application based on the update data, automatically validating the updated application based on the automated tests included in the software application, deploying, based on the automatic validation, the updated application to the production environment, publishing an update notification indicating the updated application has been deployed, and retiring the software application from the production environment.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

The description will be more fully understood with reference to the following figures, which are presented as exemplary aspects of the disclosure and should not be construed as a complete recitation of the scope of the disclosure, where.

DETAILED DESCRIPTION

Figure 1:
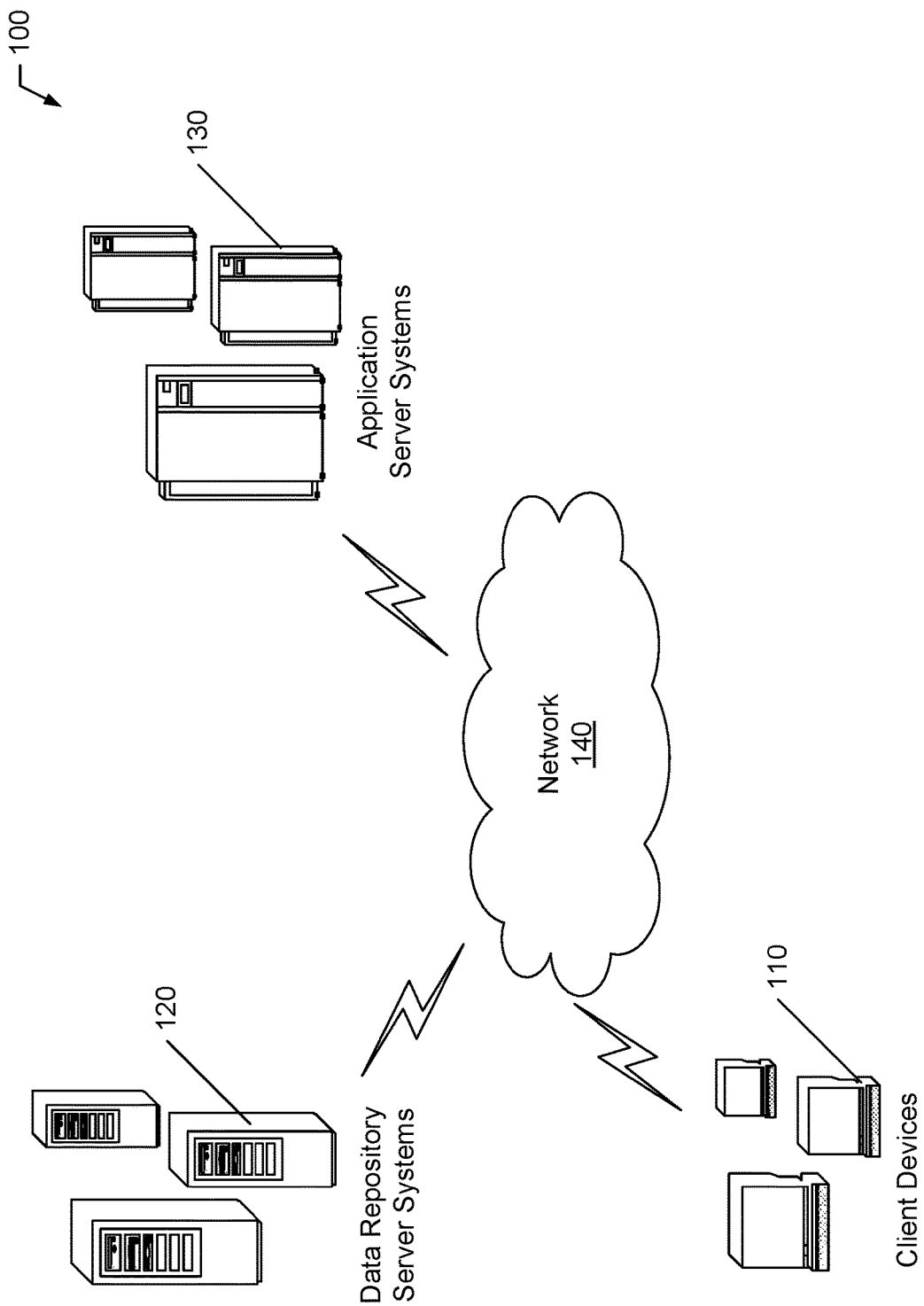
FIG. 1 illustrates a block diagram of a computing system according to an example aspect of the present disclosure.

Turning now to the drawings, techniques are disclosed for new and innovative systems and methods for in-place upgrades of applications. In many aspects, software applications provide a variety of functions that, when invoked, cause the software application to perform corresponding actions. Software applications can be deployed in a variety of environments, particularly cloud-based and networked environments where the software application can be interacted with as a service by a variety of computing devices. Typical software applications utilize an application-server based model where the software application is provided by an application server. In several aspects, software applications utilize a service-based and/or microservice architecture where the software application provides and/or interacts with a variety of services, also known as dependencies. Updating software applications, particularly service-based applications can be particularly challenging as typical processes for updating a software application includes updating the source code, recompiling the software application, and redeploying the software application. However, this typical upgrade processes is error-prone and the updates to the software application often have unintended incompatibilities in the production environment such that, when the software application is redeployed, a variety of unanticipated errors occur. These errors then require additional development time to perform additional upgrades to the software application to correct the errors.

Systems and methods in accordance with aspects of the disclosure can automatically test and deploy updated software applications. In many aspects, the systems and methods described herein allow for the in-place updating of deployed software applications within a production environment without recompiling the software application as in existing systems. In a number of aspects, software applications include one or more microservices that can be updated independently. However, when trying to update one or more microservices, it can be difficult to ensure that the updated microservices do not break the overall software application due to version incompatibilities and the like. In a variety of aspects, software applications include automated tests in the application itself. These automated tests may not be present at runtime but can be used to validate any update to the software application. In this way, the software application can automatically self-verify by testing the result of updating itself and avoiding the error-prone update processes of existing systems.

Existing upgrade processes may utilize a testing environment that does not accurately model particular nuances (e.g. software versions, database schema, and the like) of a production environment as existing processes typically do not allow modifications to software applications within a production environment. These existing processes may test and validate an updated software application in the testing environment, but as the testing environment does not fully model the production environment, when the updated application is deployed to the production environment a variety of errors can occur. In contrast, by validating the updated application in-place in the production environment, the processes in accordance with aspects of the disclosure improve on the existing techniques by allowing for accurate validation of software applications within production environments. The techniques described herein provide specific improvements over prior art systems. In particular, the techniques provide an improvement to the functioning of a computing device itself to automatically manage and update software applications, improving the availability and security of the software applications.

A variety of systems and methods in accordance with aspects of the disclosure are described in more detail below.

Computing Systems

FIG. 1 illustrates a block diagram of a computing system according to an example aspect of the present disclosure. The computing system 100 can include client devices 110, data repository server systems 120, and/or application server systems 130 in communication via network 140. In many aspects, the data repository server systems 120 and/or application server systems 130 are implemented using a single server. In a variety of aspects, the data repository server systems 120 and/or application server systems 130 are implemented using a plurality of servers. In several aspects, client devices 110 are implemented utilizing the data repository server systems 120 and/or application server systems 130. In a variety of aspects, the data repository server systems 120 and/or application server systems 130 are implemented using the client device 110.

Client devices 110 can obtain a variety of data, generate software applications, validate software applications, and deploy software applications to production environments as described herein. Client devices 110 can also provide data stored using a variety of event storage structures. Data repository server systems 120 can provide a variety of source code, automated tests, dependencies, and/or updated dependencies as described herein. In several aspects, data repository system servers 120 can include source code repository server systems and/or dependency repository server systems. Source code repository server systems can provide a variety of source code and/or automated tests, while the dependency repository server systems provide dependencies and/or updates to those dependencies. Application server systems 130 can host software applications and/or provide a production environment (such as a client-server environment, a networked environment, a cloud-based environment, and the like) allowing access to one or more services provided by the software applications as described herein. In a variety of aspects, application server systems 130 provide an environment to automatically update software applications and automatically deploy the updated software applications as described herein.

Any of the computing devices shown in FIG. 1 (e.g. client devices 110, data repository server systems 120, and application server systems 130) can include a single computing device, multiple computing devices, a cluster of computing devices, and the like. A computing device can include one or more physical processors communicatively coupled to memory devices, input/output devices, and the like. As used herein, a processor may also be referred to as a central processing unit (CPU). Additionally, as used herein, a processor can include one or more devices capable of executing instructions encoding arithmetic, logical, and/or I/O operations. In one illustrative example, a processor may implement a Von Neumann architectural model and may include an arithmetic logic unit (ALU), a control unit, and a plurality of registers. In many aspects, a processor may be a single core processor that is typically capable of executing one instruction at a time (or process a single pipeline of instructions) and/or a multi-core processor that may simultaneously execute multiple instructions. In a variety of aspects, a processor may be implemented as a single integrated circuit, two or more integrated circuits, and/or may be a component of a multi-chip module in which individual microprocessor dies are included in a single integrated circuit package and hence share a single socket. As discussed herein, a memory refers to a volatile or non-volatile memory device, such as RAM, ROM, EEPROM, or any other device capable of storing data. Input/output devices can include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. In several aspects, a computing device provides an interface, such as an API or web service, which provides some or all of the data to other computing devices for further processing. Access to the interface can be open and/or secured using any of a variety of techniques, such as by using client authorization keys, as appropriate to the requirements of specific applications of the disclosure.

The network 140 can include a LAN (local area network), a WAN (wide area network), telephone network (e.g. Public Switched Telephone Network (PSTN)), Session Initiation Protocol (SIP) network, wireless network, point-to-point network, star network, token ring network, hub network, wireless networks (including protocols such as EDGE, 3G, 4G LTE, Wi-Fi, 5G, WiMAX, and the like), the Internet, and the like. A variety of authorization and authentication techniques, such as username/password, Open Authorization (OAuth), Kerberos, SecureID, digital certificates, and more, may be used to secure the communications. It will be appreciated that the network connections shown in the example computing system 100 are illustrative, and any means of establishing one or more communications links between the computing devices may be used.

In-Place Application Updates

As described herein, software applications can be generated based on source code and automated tests can be used to validate the correct operation of the software application. The automated tests can be included with the software application when it is deployed to a production environment. The included automated tests can be used to validate the software application in the production environment in a variety of instances, such as when one or more dependencies of the software application are updated. In this way, the software application can be updated and validated without having to rebuild and/or redeploy the software application to the production environment.

Figure 2:
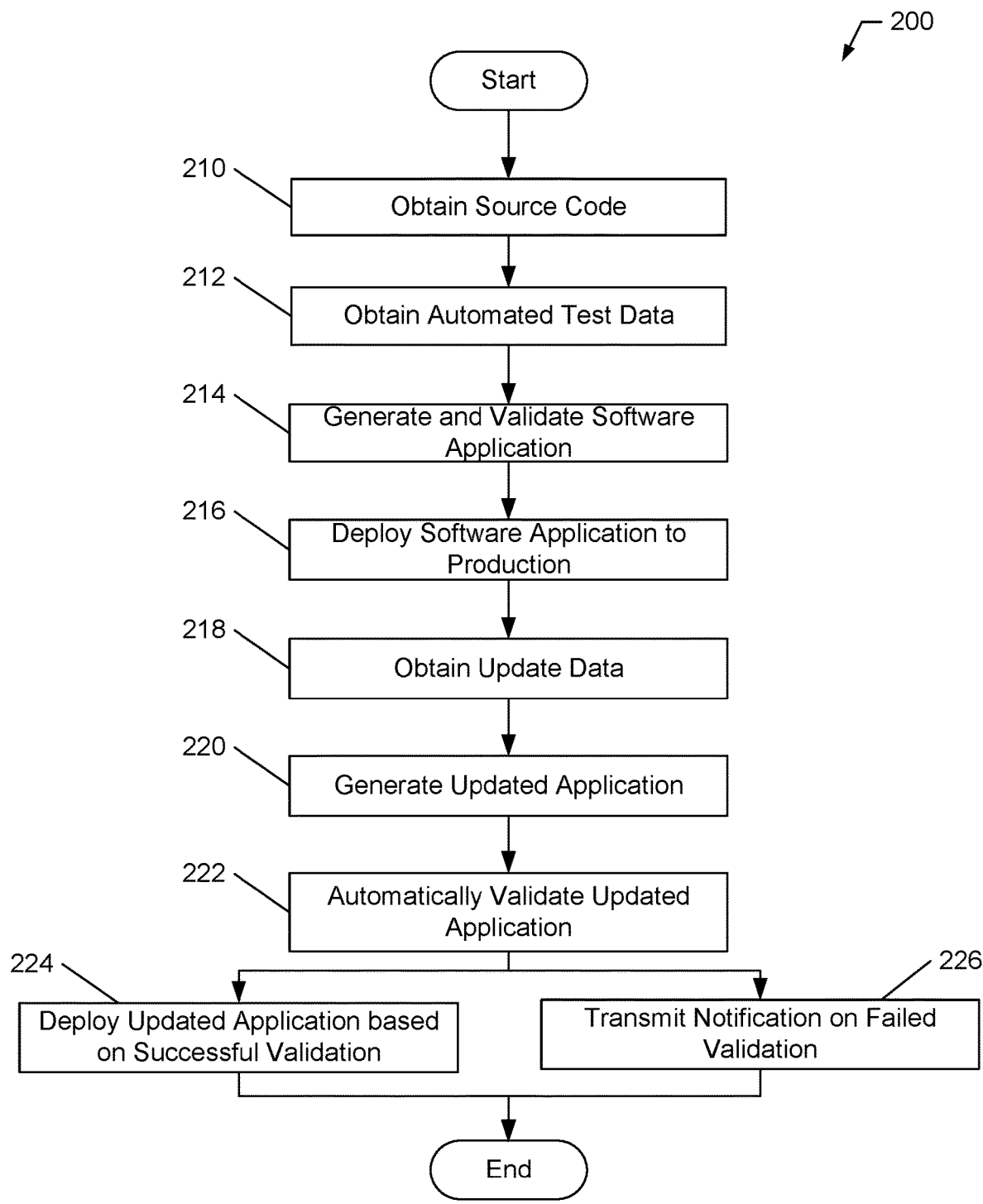
FIG. 2 illustrates a flowchart of a process for in-place updates of deployed applications according to an example aspect of the present disclosure.

FIG. 2 illustrates a flowchart of a process for in-place updates of deployed applications according to an example aspect of the present disclosure. Although the process 200 is described with reference to the flowchart illustrated in FIG. 2, it will be appreciated that many other methods of performing the acts associated with the process 200 may be used. For example, the order of some of the blocks may be changed, certain blocks may be combined with other blocks, one or more blocks may be repeated, and some of the blocks described are optional. The process 200 may be performed by processing logic that may include hardware (circuitry, dedicated logic, etc.), software, or a combination of both.

Source code can be obtained (block 210). Source code can include a variety of instructions written in a programming language that can be compiled by an assembler or compiler into a software application that can be executed by a computing device. In several aspects, the source code can be interpreted by an interpreter for execution by the computing device. The source code can define one or more functions that include instructions to perform specific action(s) associated with the function. These functions can be private (e.g. only visible and/or usable by the software application itself) and/or public (e.g. visible and/or usable outside the software application). For example, a web service or other application programming interface can provide access to one or more public functions defined in the source code. In many aspects, one or more functions of the software application can correspond to services (e.g. microservices) provided by the software application. The source code can also include references to one or more dependencies. A dependency can include source code, object code, and/or bytecode (e.g. executable programs, libraries, and the like) that are utilized by, but are separate from, the software application. That is, a dependency can be a reusable artifact utilized in the software application but not created as part of the software application itself. The dependencies can include a name, an identifier, a version number, a location (e.g. a URL) where files associated with the dependency can be obtained, compatibility data indicating which versions of a dependency are compatible with each other, and/or any other data related to the dependencies. A particular version of a dependency can have a variety of errors and/or security flaws, such as common vulnerabilities and exposures that are publicly published by security researchers. These errors and/or security flaws can be patched in later version(s) of the dependency.

Automated test data can be obtained (block 212). The automated tests can be used to automatically validate the software application. The automated tests can be used to test and validate any operation of the software application, such as validating the operation of one or more functions provided by a software application, validating that the software application executes properly within a production environment, that the software application can obtain and/or store data in a database, and the like. Automated tests can include, but are not limited to, unit tests, integration tests, performance tests, acceptance tests, installation tests, compatibility tests, sanity tests, regression tests, functional tests, nonfunctional tests, conformance tests, output tests, and/or any other tests utilized in the development of software applications as used by a person having ordinary skill in the art.

A software application can be generated and validated (block 214). The software application can be generated by compiling the source code into object code and/or bytecode and bundling the object code and/or bytecode along with any dependencies into a software application. The automated tests can be executed in order to validate the source code, object code, bytecode, and/or software application as appropriate to the specific tests being performed. Validating a function can include executing the automated tests to determine that one or more function(s) perform the appropriate functionality specified in the source code and/or requirements documents, determining the function responds appropriately to valid and invalid inputs, determining the function performs its operation(s) in an acceptable time and/or with an acceptable usage of computing resources (e.g. processor power, memory usage, and the like), properly interacts with any dependencies, and the like. Generating the software application can also include bundling the automated tests into the software application. By including the automated tests in the software application, in-place updates to the software application can be automatically validated by a variety of computing devices, including computing devices providing a production environment. In many aspects, one or more steps defined in build metadata can be performed by executing a build automation tool to process the build metadata, obtain the indicated dependencies, compile any source code, and build (e.g. generate) the software application including the automated tests.

The software application can be deployed to a production environment (block 216). The software application can be deployed to a production environment by transmitting a copy of the software application and performing a variety of actions to execute the software application within the production environment. The actions to deploy the software application can be specified in deployment instructions that, when executed, cause the software application to be published (or otherwise deployed) into the production environment. For example, the software application can be installed by an operating system providing the production environment and the installed application can be executed. In a variety of aspects, the production environment is provided by one or more application server systems. Once deployed, one or more public functions and/or services (e.g. microservices) provided by the software application can be accessed by any of a variety of computing devices.

Update data can be obtained (block 218). The update data can include one or more updated dependencies, references to updated dependencies, and/or updated functions (e.g. services or microservices) as described herein. For example, a particular version of a dependency can have a variety of errors and/or security flaws, such as common vulnerabilities and exposures that are publicly published by security researchers. These errors and/or security flaws can be patched in later version(s) of the dependency. In a variety of aspects, the update data includes a model implemented using a language such as, but not limited to, JavaScript Object Notation or the Extensible Markup Language that specifies the dependencies that should be updated. The update data can include the updated dependencies and/or a reference (e.g. a uniform resource locator) to a location (e.g. a computing device) where the updated dependencies can be obtained.

An updated application can be generated (block 220). In several aspects, the updated application can be updated by replacing one or more dependencies with updated dependencies as indicated in the update data. In many aspects, the update data can include an update to a particular function (e.g. service or microservice) of a software application having a service-based architecture or a microservice architecture. The updated microservice can be deployed to update the software application without having to redeploy the entire application. In this way, the update data can be used to update deployed software applications and/or services to correct errors and/or security flaws as described herein. The updated application can include the automated tests as described herein. In this way, the updated application can be updated and validated at a future time.

The updated application can be automatically validated (block 222). The updated application can be validated by performing the automated tests included in the software application. By performing the automated tests against the updated application, the functionality of the software application with the new dependencies can be validated to ensure correct operation. The updated application can be automatically validated as described herein.

The updated application can be deployed to the production environment based on a successful validation (block 224). The updated application can be deployed to the production environment as described herein, such as with respect to block 216. In a variety of aspects, deploying the updated application includes providing a second, updated version of the software application in the production environment. A variety of techniques for providing multiple versions of a software application and retiring outdated software applications are described in more detail herein, including with respect to FIG. 4.

A notification can be transmitted based on a failed validation (block 226). In several aspects, if the validation is unsuccessful, the software application is not deployed. The notification can indicate any errors that occurred during the generation and/or validation of the updated software application, such as build errors, failed tests in the suite of automated tests, and the like. The notification can be transmitted to any of a variety of computing devices such that the errors can be manually and/or automatically corrected. In many aspects, the notification can cause a computing device to automatically obtain a compatible version of a dependency, different from the version indicated in the update data, and automatically reattempt the generation and/or validation of the updated software application as described herein.

Figure 3:
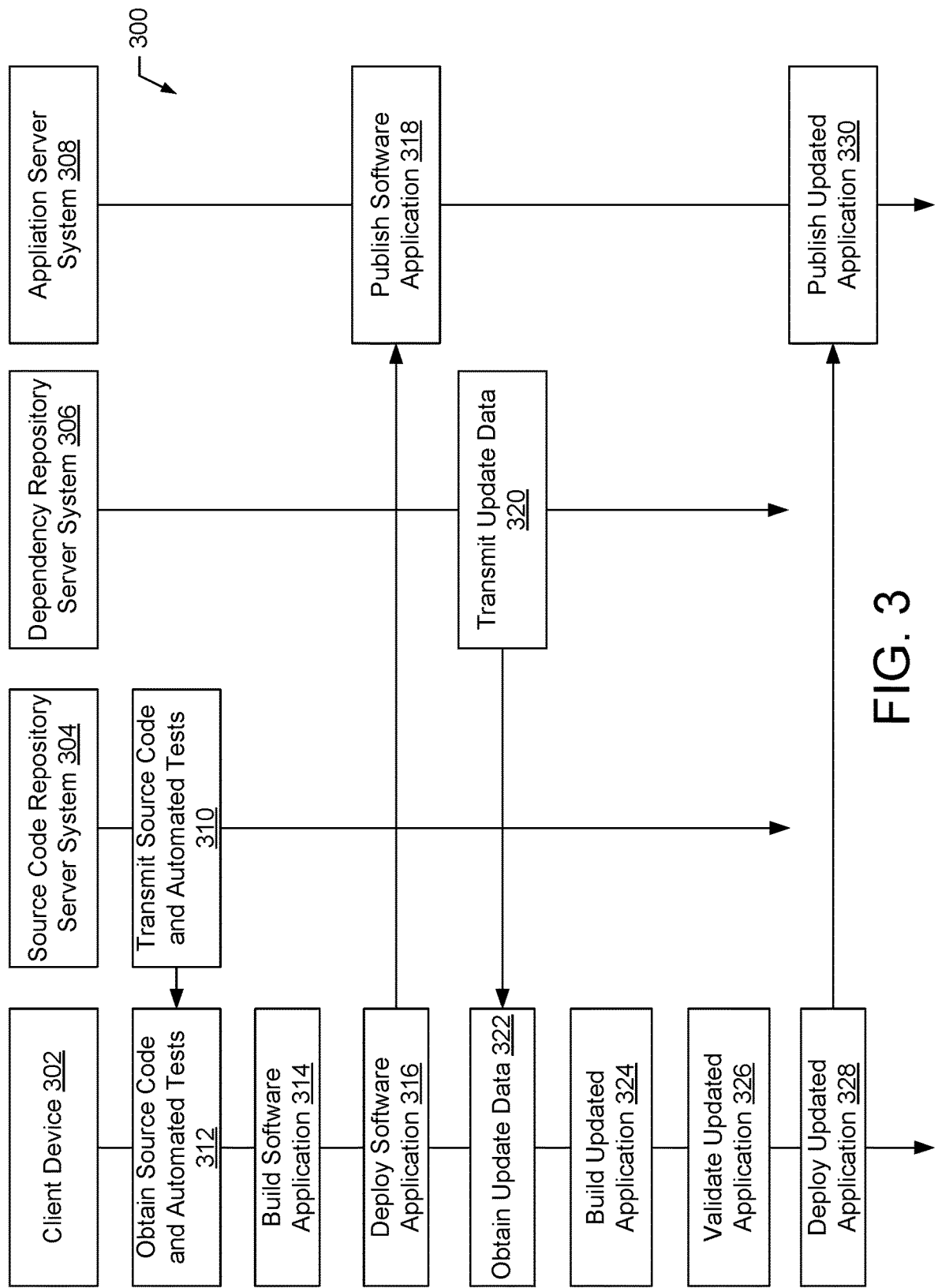
FIG. 3 illustrates a flow diagram of a process for in-place updates of deployed applications according to an example aspect of the present disclosure.

FIG. 3 illustrates a flow diagram of a process for in-place updates of deployed applications according to an example aspect of the present disclosure. Although the process 300 is described with reference to the flow diagram illustrated in FIG. 3, it will be appreciated that many other methods of performing the acts associated with the process 300 may be used. For example, the order of some of the blocks may be changed, certain blocks may be combined with other blocks, one or more blocks may be repeated, and some of the blocks described are optional. For example, source code repository system 304 and dependency repository server system 306 can be implemented using a single data repository server system.

At block 310, a source code repository server system 304 can transmit source code and/or automated tests to a client device 302. The source code can be used to generate a software application and the automated tests can be used to validate the source code and/or software application as described herein. At block 312, the client device 302 can obtain the source code and automated tests. At block 314, the client device 302 can build a software application. The client device 302 can build the software application by compiling the source code into object code and/or bytecode and bundling the object code, bytecode, associated dependencies, and the automated tests into a software application as described herein. At block 316, the client device 302 can deploy the software application to an application server system 308. The client device 302 can deploy the software application by transmitting the software application and/or any deployment instructions to the application server system 308 as described herein. At block 318, the application server system can publish the software application. Publishing the software application can include executing the software application within a production environment as described herein.

At block 320, a dependency repository server 306 system can transmit update data to the client device 302. The update data can include updates to one or more dependencies and/or functions (e.g. services or microservices) provided by the software application as described herein. At block 322, the client device 302 can obtain the update data. At block 324, the client device 302 can build an updated application. The client device can build the updated application to update one or more dependencies and/or functions of the software application based on the update data as described herein. In many aspects, the updated application is built without having to recompile (or otherwise rebuild) the software application using the source code for the software application. In a variety of aspects, the updated application includes the automated tests included in the software application. At block 326, the client device 302 can validate the updated application using the automated tests as described herein. In this way, the updated application can be validated without accessing the original automated tests provided by the source code repository server system 304. At block 328, the client device 302 can deploy the updated application to the application server system 308 as described herein. At block 330, the application server system 308 can publish the updated software application as described herein.

Although process 300 is described with respect to building and deploying the updated application using the client device 302, it should be noted that, in a variety of aspects, the updated application can be generated, validated, and deployed via any computing device described herein. In particular, it should be appreciated that the update data can be transmitted to the application server system 308 at block 322, and the application server system 308 can build the updated application at block 324 and validate the updated application using the automated tests included in the software application and/or updated software application at block 326. In this way, the updated application can be generated and validated in-place on the application server system 308 providing the production environment in which the software application and/or updated application are published.

In a variety of aspects, software applications are deployed to a production environment using a contained-based deployment model. These containers can include virtualized machines that execute within a virtual environment provided by an operating system of a computing device. Each container can be isolated from other containers within the production environment to improve the security and/or portability of the containers. The containers can be transferred to other computing devices to deploy the software application in a variety of production environments. In many aspects, the Docker Engine provided by Docker, Inc. can be used to implement the containers.

Figure 4:
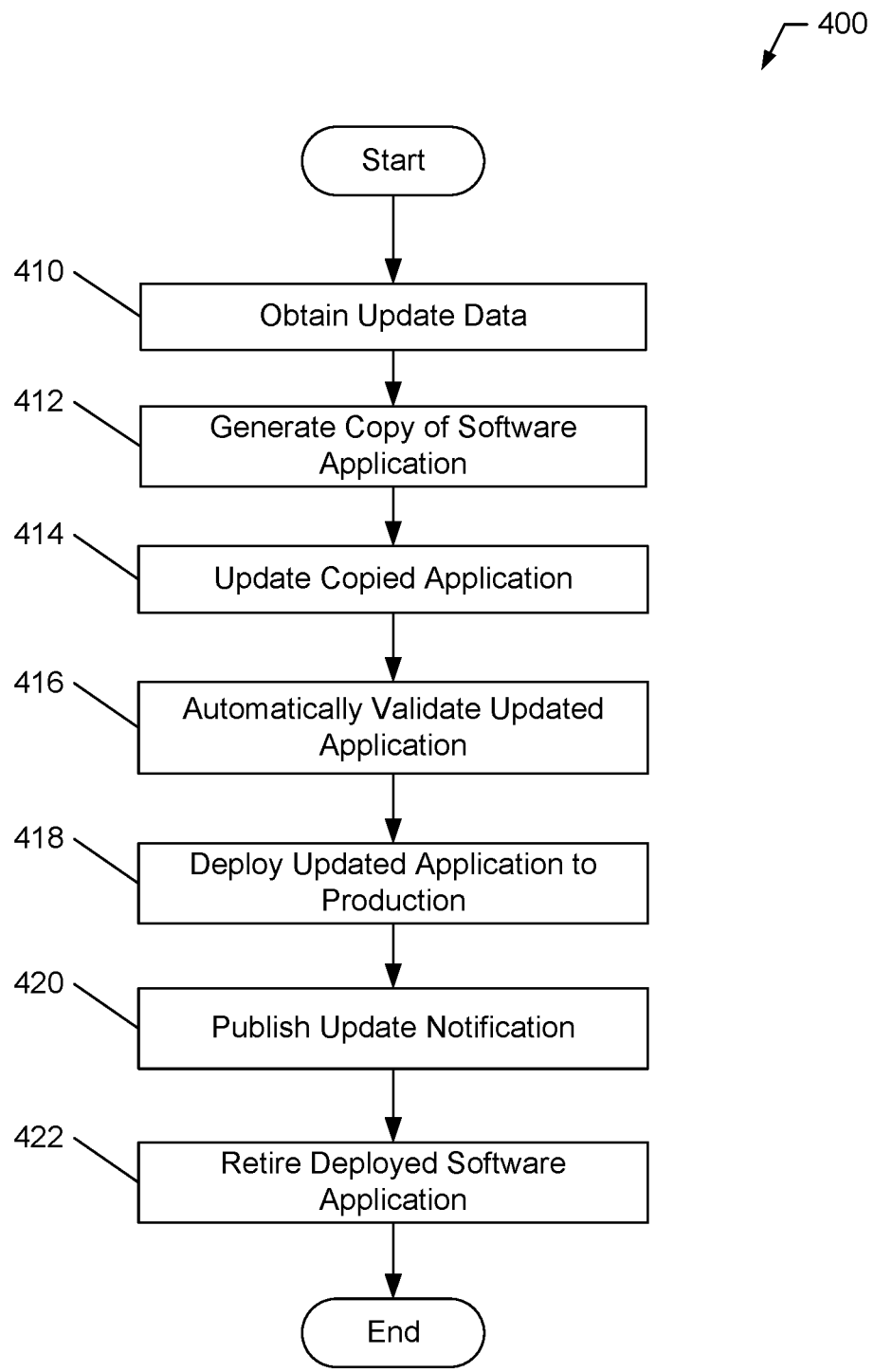
FIG. 4 illustrates a flowchart of a process for automatically upgrading deployed applications according to an example aspect of the present disclosure.

FIG. 4 illustrates a flowchart of a process for automatically upgrading deployed applications according to an example aspect of the present disclosure. Although the process 400 is described with reference to the flowchart illustrated in FIG. 4, it will be appreciated that many other methods of performing the acts associated with the process 400 may be used. For example, the order of some of the blocks may be changed, certain blocks may be combined with other blocks, one or more blocks may be repeated, and some of the blocks described are optional. The process 400 may be performed by processing logic that may include hardware (circuitry, dedicated logic, etc.), software, or a combination of both. Additionally, while process 400 is described with respect to the updating of software applications in containerized production environments, it should be noted that any production environment, including those where software applications are deployed without the use of containers, can be used in accordance with aspects of the disclosure.

Update data can be obtained (block 410). The update data can include updates to one or more dependencies and/or functions of a software application deployed in a production environment as described herein.

A copy of a software application can be generated (block 412). In many aspects, the copy of the software application can include copying a container providing the software application in the production environment as described herein. The copied application can be updated (block 414). The copied application can be updated by updating one or more dependencies and/or functions of the copied application as described herein. In several aspects, updating the copied application includes updating a version number of the container and/or software application. The updated application can be automatically validated (block 416). The copied application can be validated using the automated tests included in the deployed software application and/or the copied application as described herein.

The updated application can be deployed to a production environment (block 418). In a variety of aspects, the updated application is deployed based on a successful validation of the updated application as described herein. In a number of aspects, if the validation fails, a notification may be transmitted as described herein and the process 400 ends.

In several aspects, deploying the updated application to the production environment replaces the existing deployed software application. In a number of aspects, deploying the updated application results in multiple versions of the software application being provided within the production environment. In these instances, it may be desirable to notify consumers of the software application (e.g. software applications that access the software application) that an updated version of the software application is available. In several aspects, older versions of the software application can be retired from the production environment. In this way, outdated and/or insecure versions of a software application can be shut down so that any flaws and/or vulnerabilities present in the software application cannot be exploited.

An update notification can be published (block 420). The update notification can be published by the production environment, the deployed software application, the updated application, and/or any other entity or computing device as described herein. The update notification can indicate that an updated version of the deployed software application is available and/or provide a reference (e.g. a uniform resource locator) to the updated application. The update notification can be published in a manner accessible to any computing device (e.g. consumer) of the deployed software application, either indirectly and/or directly. In many aspects, the update notification can be provided as a push notification to one or more consumers of the deployed software application. In a variety of aspects, the update notification can be published in a directory (e.g. index) of services provided by the production environment. The consumers of the application can be updated (either automatically and/or manually) based on the update notification to migrate from the deployed software application to the updated application.

The deployed software application can be retired (block 422). The deployed software application can be retired by making the deployed software application inaccessible from the production environment. In several aspects, the software application is removed from the production environment by deleting the software application from the computing device providing the production environment. In a number of aspects, the software application is removed from the production environment by deleting a container providing the software application from the computing device. In many aspects, the deployed software application is retired by shutting down a virtual machine providing the software application based on the container. In this way, the deployed software application can be automatically updated in-place within the production environment.

Figure 5:
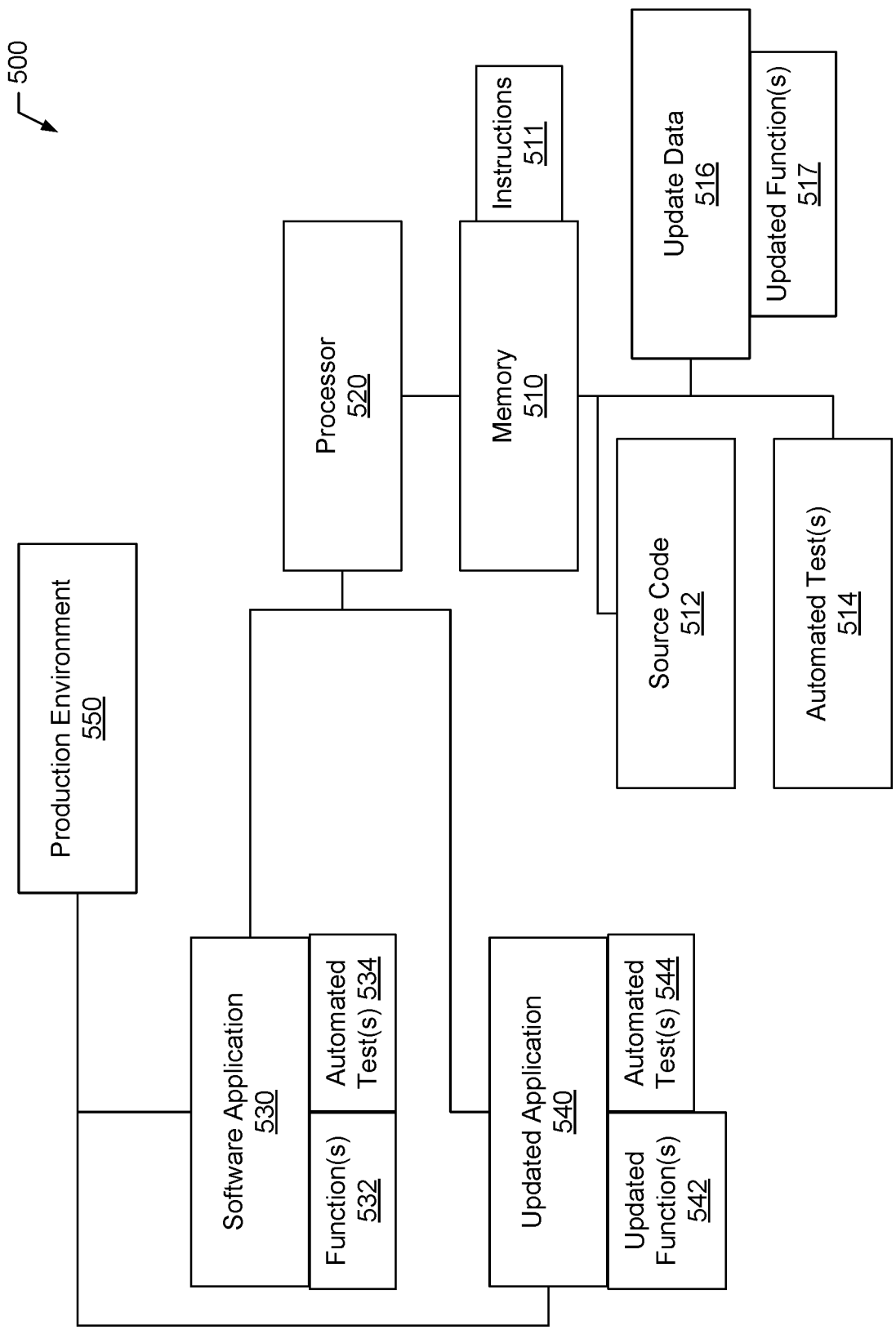
FIG. 5 illustrates a block diagram of an apparatus according to an example aspect of the present disclosure.

FIG. 5 illustrates a block diagram of an apparatus according to an example aspect of the present disclosure. The system 500 includes a memory 510 and a processor 520 in communication with the memory 510. The memory 510 can store instructions 511 that, when executed by the processor 520, cause the system 500 to perform a variety of processes as described herein. The instructions 511 can be embodied in computer-usable or readable data and include computer-executable instructions, such as in one or more program modules, executed by one or more computing devices as described herein. Program modules can include routines, programs, objects, components, data structures, and the like that perform particular tasks or implement particular abstract data types when executed by a processor. The modules may be written in a programming language that is subsequently compiled or interpreted for execution. Particular data structures may be used to more effectively implement one or more aspects discussed herein, and such data structures are contemplated within the scope of computer executable instructions and computer-usable data described herein.

The processor 520 can obtain source code 512 and automated test(s) 514. The processor can generate a software application 530 based on the source code 512. The software application 530 includes automated test(s) 534 and a plurality of function(s) 532. In a variety of aspects, the automated test(s) 534 include some or all of the automated tests 514. The processor 520 can validate the software application 530 based on the automated tests 514. In a variety of aspects, validating the software application 530 includes validating the function(s) 532 based on corresponding tests in the automated test(s) 534. The processor 520 can deploy the software application 530 to a production environment 550.

The processor 520 can obtain update data 516. Update data 516 can include one or more updated functions 517 that update at least one function of function(s) 532. The processor 520 can generate an updated application 540 based on the update data 516. The updated application 540 can include the updated function(s) 542 and automated test(s) 544. In a variety of aspects, updated function(s) 542 are generated by updating one or more of the function(s) 532 with a corresponding function in the updated function(s) 517. In many aspects, the automated test(s) 544 are a copy of the automated test(s) 534.

The processor 520 can automatically validate the updated application 540 based on the automated test(s) 544 as described herein. In many aspects, validating the updated application 540 includes validating the updated function(s) 542 based on corresponding tests in the automated test(s) 544. The processor can deploy, based on the automatic validation, the updated application 540 to the production environment 550. In several aspects, if the validation of updated application 540 fails, the processor 520 can transmit a notification indicating that the validation failed. In a number of aspects, the processor 520 deploys the updated application 540 to the production environment 550 based on the validation completing successfully.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, aspects of the present disclosure should be considered in all respects as illustrative and not restrictive. It will be evident to the annotator skilled in the art to freely combine several or all of the aspects discussed here as deemed suitable for a specific application of the disclosure. Throughout this disclosure, terms like "advantageous", "exemplary" or "preferred" indicate elements or dimensions which are particularly suitable (but not essential) to the disclosure or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. A computer-implemented method, comprising:
    obtaining source code indicating one or more dependencies;
    obtaining automated tests from a repository server system to perform validation in a production environment separate from the repository server system;
    generating a software application based on the source code, wherein the software application is validated based on executing the automated tests and the software application comprises the automated tests;
    deploying the software application to the production environment, the software application comprising the automated tests such that the automated tests obtained from the repository server system separate from the production environment are usable to validate the software application in the production environment;
    obtaining update data indicating one or more updated dependencies configured to replace the one or more dependencies associated with the software application;
    generating an updated application based on the software application and the update data such that the updated application comprises the automated tests of the software application and the one or more updated dependencies;
    executing a validation process on the updated application in the production environment based on executing the automated tests of the updated application that were previously included in the software application before the software application was deployed to the production environment;
    detecting that the validation process failed based on at least one error occurring during the validation process;
    in response to detecting that the validation process failed, outputting a notification to obtain a version of a dependency different from the one or more updated dependencies indicated in the update data, the notification indicating the at least one error associated with the validation process that failed;
    subsequent to outputting the notification, reattempting the validation process of the updated application updated to comprise the version of the dependency different from the one or more updated dependencies, the validation process reattempted using the automated tests of the updated application; and
    executing, based on the validation process being successful, the updated application in the production environment.

2. The computer-implemented method of claim 1, further comprising:
    publishing an update notification indicating the updated application has been deployed; and
    retiring the software application from the production environment.

3. The computer-implemented method of claim 1, wherein the software application comprises a plurality of microservices.

4. The computer-implemented method of claim 3, wherein:
    the update data comprises an update to at least one microservice of the plurality of microservices; and
    the updated application comprises the at least one updated microservice.

5. The computer-implemented method of claim 4, wherein the software application is deployed to the production environment using a first container executable in a virtual environment of an operating system, and wherein generating the updated application comprises:
    generating a second container comprising a copy of the first container providing the software application in the production environment, wherein the second container comprises a copy of the software application to be updated using the update data to generate the updated application;
    replacing at least one of the plurality of microservices of the copied software application provided by the second container with a corresponding microservice from the at least one updated microservice to update the copied software application of the second container; and
    validating the updated application by validating the at least one updated microservice based on the automated tests included in the updated application of the second container.

6. The computer-implemented method of claim 5, wherein executing the updated application in the production environment comprises transmitting the second container comprising the copy of the first container and the updated application to the production environment.

7. The computer-implemented method of claim 4, wherein validating the updated application comprises validating the at least one updated microservice by executing the automated tests included in the software application to determine whether the at least one updated microservice performs one or more operations using an amount of computing resources that is below a threshold.

8. An apparatus, comprising:
a processor; and
a memory in communication with the processor and storing instructions that, when executed by the processor, cause the apparatus to:
obtain source code indicating one or more dependencies and defining a plurality of functions to perform an action associated with each function;
obtain automated tests from a repository server system to perform validation in a production environment separate from the repository server system;
generate a software application based on the source code, wherein the software application comprises the automated tests and the plurality of functions validated based on executing the automated tests;
deploy the software application to the production environment, the software application comprising the automated tests such that the automated tests obtained from the repository server system separate from the production environment are usable to validate the software application in the production environment;
obtain update data indicating one or more updated dependencies configured to replace the one or more dependencies associated with the software application and comprising an update to at least one function of the plurality of functions;
generate an updated application based on the software application and the update data such that the updated application comprises the one or more updated dependencies, the updated at least one function, and the automated tests previously included in the software application;
execute a validation process on the updated application in the production environment based on executing the automated tests of the updated application that were previously included in the software application before the software application was deployed to the production environment;
detect that the validation process failed based on at least one error occurring during the validation process;
in response to detecting that the validation process failed, output a notification to obtain a version of a dependency different from the one or more updated dependencies indicated in the update data, the notification indicating at least one error associated with the validation process that failed;
subsequent to outputting the notification, reattempt the validation of the updated application updated to comprise the version of the dependency different from the one or more updated dependencies, the validation process reattempted using the automated tests of the updated application; and
execute, based on the validation process being successful, the updated application in the production environment.

9. The apparatus of claim 8, wherein the instructions, when executed by the processor, further cause the apparatus to:
publish an update notification indicating the updated application has been deployed; and
retire the software application from the production environment.

10. The apparatus of claim 8, wherein the functions of the software application comprise a plurality of microservices.

11. The apparatus of claim 10, wherein:
the update data comprises the update to at least one microservice of the plurality of microservices; and
the updated application comprises the at least one updated microservice.

12. The apparatus of claim 11, wherein the software application is deployed to the production environment using a first container executable in a virtual environment of an operating system, and wherein generating the updated application comprises:
generating a second container comprising a copy of the first container providing the software application in the production environment, wherein the second container comprises a copy of the software application to be updated using the update data to generate the updated application;
replacing at least one of the plurality of microservices of the copied software application provided by the second container with a corresponding microservice from the at least one updated microservice to update the copied software application of the second container; and
validating the updated application by validating the at least one updated microservice based on the automated tests included in the updated application of the second container.

13. The apparatus of claim 12, wherein the instructions, when executed by the processor, further cause the apparatus to execute the updated application in the production environment by transmitting the second container comprising the copy of the first container and the updated application to the production environment.

14. The apparatus of claim 11, wherein the instructions, when executed by the processor, further cause the apparatus to validate the updated application by validating the at least one updated microservice by executing the automated tests included in the software application to determine whether the at least one updated microservice performs one or more operations using an amount of computing resources that is below a threshold.

15. A non-transitory computer readable medium storing instructions that, when executed by one or more processors, cause the one or more processors to perform steps comprising:
obtaining source code comprising a respective reference to one or more dependencies;
obtaining automated tests from a repository server system to perform validation in a production environment separate from the repository server system;
generating a software application based on the source code, wherein the software application is validated based on executing the automated tests and the software application comprises the automated tests;
deploying the software application to the production environment, the software application comprising the automated tests such that the automated tests obtained from the repository server system separate from the production environment are usable to validate the software application in the production environment;

obtaining update data indicating one or more updated dependencies configured to replace the one or more dependencies associated with the software application;

generating an updated application based on the software application and the update data such that the updated application comprises the automated tests of the software application and the one or more updated dependencies;

executing a validation process on the updated application in the production environment based on executing the automated tests of the updated application that were previously included in the software application before the software application was deployed to the production environment;

detecting that the validation process failed based on at least one error occurring during the validation process;

in response to detecting that the validation process failed, outputting a notification to obtain a version of a dependency different from the one or more updated dependencies indicated in the update data, the notification indicating at least one error associated with the validation process that failed;

subsequent to outputting the notification, reattempting the validation of the updated application updated to comprise the version of the dependency different from the one or more updated dependencies, the validation process reattempted using the automated tests of the updated application;

executing, based on the validation process being successful, the updated application to the production environment;

publishing an update notification indicating the updated application has been deployed; and retiring the software application from the production environment.

16. The non-transitory computer readable medium of claim 15,
wherein the software application comprises a plurality of microservices.

17. The non-transitory computer readable medium of claim 16, wherein:
the update data comprises an update to at least one microservice of the plurality of microservices; and
the updated application comprises the at least one updated microservice.

18. The non-transitory computer readable medium of claim 17, wherein the software application is deployed to the production environment using a first container executable in a virtual environment of an operating system, and wherein generating the updated application comprises:
generating a second container comprising a copy of the first container providing the software application in the production environment, wherein the second container comprises a copy of the software application to be updated using the update data to generate the updated application;
replacing at least one of the plurality of microservices of the copied software application provided by the second container with a corresponding microservice from the at least one updated microservice to update the copied software application of the second container; and
validating the updated application by validating the at least one updated microservice based on the automated tests included in the updated application of the second container.

19. The non-transitory computer readable medium of claim 18, wherein executing the updated application in the production environment comprises transmitting the second container comprising the copy of the first container and the updated application to the production environment.

20. The non-transitory computer readable medium of claim 17, wherein validating the updated application comprises validating the at least one updated microservice by executing the automated tests included in the software application to determine whether the at least one updated microservice performs one or more operations using an amount of computing resources that is below a threshold.

* * * * *